US006596451B2

(12) United States Patent
Dontula et al.

(10) Patent No.: US 6,596,451 B2
(45) Date of Patent: Jul. 22, 2003

(54) NACREOUS IMAGING ELEMENT CONTAINING A VOIDED POLYMER LAYER

(75) Inventors: Narasimharao Dontula, Rochester, NY (US); Peter T. Aylward, Hilton, NY (US); Robert P. Bourdelais, Pittsford, NY (US); Alphonse D. Camp, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/931,355

(22) Filed: Aug. 16, 2001

(65) Prior Publication Data

US 2003/0059697 A1 Mar. 27, 2003

(51) Int. Cl.$^7$ .......................... G03C 1/765; G03C 1/79; G03C 1/795; G03C 1/825; G03C 1/91
(52) U.S. Cl. .......................... 430/60; 430/56; 430/201; 430/220; 430/496; 430/510; 430/523; 430/533; 430/536; 347/106
(58) Field of Search .............................. 430/11, 14, 220, 430/496, 523, 510, 533, 536, 56, 60, 104, 201; 347/106

(56) References Cited

U.S. PATENT DOCUMENTS

| 3,154,461 A | 10/1964 | Johnson | 161/116 |
|---|---|---|---|
| 3,640,944 A | 2/1972 | Seppala et al. | |
| 3,944,699 A | 3/1976 | Mathews et al. | |
| 4,216,018 A | 8/1980 | Bilofsky et al. | 430/220 |
| 4,269,916 A | 5/1981 | Bilofsky et al. | 430/220 |
| 4,288,524 A | 9/1981 | Bilofsky et al. | 430/220 |
| 4,377,616 A | 3/1983 | Ashcraft et al. | 428/213 |
| 4,579,810 A | * 4/1986 | Johnson et al. | 430/536 |
| 4,613,563 A | 9/1986 | Murai | |
| 4,728,595 A | 3/1988 | Hayashi et al. | |
| 4,910,235 A | * 3/1990 | Satake et al. | 523/171 |
| 5,340,692 A | 8/1994 | Vermeulen et al. | 430/233 |
| 5,466,519 A | 11/1995 | Shirakura et al. | 428/323 |
| 5,733,658 A | 3/1998 | Schmid et al. | |
| 5,858,078 A | 1/1999 | Andes et al. | |
| 5,866,282 A | 2/1999 | Bourdelais et al. | 430/536 |
| 5,888,681 A | 3/1999 | Gula et al. | 430/536 |
| 6,030,756 A | 2/2000 | Bourdelais et al. | |
| 6,030,759 A | 2/2000 | Gula et al. | 430/536 |
| 6,071,654 A | 6/2000 | Camp et al. | 430/536 |
| 6,071,680 A | 6/2000 | Bourdelais et al. | 430/536 |
| 6,274,284 B1 | 8/2001 | Aylward et al. | 430/536 |

FOREIGN PATENT DOCUMENTS

| EP | 0 864 621 | 9/1998 |
|---|---|---|
| GB | 1563591 | 3/1980 |

* cited by examiner

Primary Examiner—Richard L. Schilling
(74) Attorney, Agent, or Firm—Paul A. Leipold

(57) ABSTRACT

The invention relates to an imaging element comprising an imaging layer, a nacreous pigment, and at least one layer comprising voids.

41 Claims, No Drawings

NACREOUS IMAGING ELEMENT CONTAINING A VOIDED POLYMER LAYER

FIELD OF THE INVENTION

This invention relates to imaging materials. In a preferred form, it relates to nacreous voided photographic reflective paper and imaging substrate.

BACKGROUND OF THE INVENTION

Prior art reflective imaging output materials such as silver halide reflective images or ink jet reflective images typically comprise imaging layers applied to a white reflective base material. The white reflective base reflects ambient light back to the observer's eye to form the image in the brain. Prior art base materials typically utilize white reflecting pigments such as $TiO_2$ or barium sulfate in a polymer matrix to form a white reflective base material. Prior art reflective photographic papers also contain white pigments in the support just below the silver halide imaging layers to obtain image whiteness and sharpness during image exposure, as the white pigment reduces the amount exposure light energy scattered by the cellulose paper core. Details on the use of white pigments in highly loaded coextruded layers to obtain silver halide image sharpness and whiteness are recorded in U.S. Pat. No. 5,466,519.

It has been proposed in U.S. Pat. No. 5,866,282 (Bourdelais et al) to utilize a composite support material with laminated biaxially oriented polyolefin sheets as a photographic imaging material. In U.S. Pat. No. 5,866,282, biaxially oriented polyolefin sheets are extrusion laminated to cellulose paper to create a support for silver halide imaging layers. The biaxially oriented sheets described in U.S. Pat. No. 5,866,282 have a microvoided layer in combination with coextruded layers that contain white pigments such as $TiO_2$ above and below the microvoided layer. The composite imaging support structure described in U.S. Pat. No. 5,866,282 has been found to be more durable, sharper and brighter than prior art photographic paper imaging supports that use cast melt extruded polyethylene layers coated on cellulose paper.

Blends of linear polyesters with other incompatible materials of organic or inorganic nature to form microvoided structures are well-known in the art. U.S. Pat. No. 3,154,461 discloses, for example, linear polyesters blended with, for example, calcium carbonate. U.S. Pat. No. 3,944,699 discloses blends of linear polyesters with 3 to 27% of organic material such as ethylene or propylene polymer. U.S. Pat. No. 3,640,944 also discloses the use of poly(ethylene terephthalate) blended with 8% organic material such as polysulfone or poly(4-methyl-1-pentene). U.S. Pat. No. 4,377,616 discloses a blend of polypropylene to serve as the matrix with a small percentage Of another and incompatible organic material, nylon, to initiate microvoiding in the polypropylene matrix. U.K. Patent Specification 1,563,591 discloses linear polyester polymers for making opaque thermoplastic film support in which have been blended finely divided particles of barium sulfate together with a void-promoting polyolefin, such as polyethylene, polypropylene or poly-4-methyl-1-pentene.

The above-mentioned patents show that it is known to use incompatible blends to form films having paper-like characteristics after such blends have been extruded into films and the films have been quenched, biaxially oriented and heat set. The minor component of the blend, due to its incompatibility with the major component of the blend, upon melt extrusion into film forms generally spherical particles each of which initiates a microvoid in the resulting matrix formed by the major component. The melting points of the void initiating particles, in the use of organic materials, should be above the glass transition temperature of the major component of the blend and particularly at the temperature of biaxial orientation.

As indicated in U.S. Pat. No. 4,377,616, spherical particles initiate voids of unusual regularity and orientation in a stratified relationship throughout the matrix material after biaxial orientation of the extruded film. Each void tends to be of like shape, not necessarily of like size since the size depends upon the size of the particle. Ideally, each void assumes a shape defined by two opposed and edge contacting concave disks. In other words, the voids tend to have a lens-like or biconvex shape. The voids are oriented so that the two major dimensions are aligned in correspondence with the direction of orientation of the film structure. One major dimension is aligned with machine direction orientation, a second major dimension is aligned with the transverse direction orientation, and a minor dimension approximately corresponds to the cross-section dimension of the void-initiating particle.

It has been proposed in U.S. Pat. No. 6,071,680 (Bourdelais et al) to utilize a voided polyester sheet coated with light sensitive silver halide imaging layers for use as photographic output material. The voided layer in U.S. Pat. No. 6,071,680 improves opacity, image lightness, and image brightness compared to prior art polyethylene melt extrusion coated cellulose paper base materials. The image base proposed in U.S. Pat. No. 6,071,680 also contains an integral polyolefin skin layer to facilitate imaging layer adhesion at the time of manufacture and during the processing of silver halide imaging layers.

There, however, remains a continuing need for improvements to the appearance of imaging output materials. It has been shown that consumers, in addition to reflective output material, also prefer nacreous images. Nacreous images exhibit a pearly or nacreous luster, an iridescent play of colors, and a brilliant luster that appears in three dimensions. Nacreous appearance can be found in nature if one examines a pearl or the polished shell of *Turbo marmoratus*.

A nacreous photographic element with a microvoided sheet of opalescence is described in U.S. Pat. No. 5,888,681 (Gula et al). In U.S. Pat. No. 5,888,681 microvoided polymer sheets with microvoided polymer layer located between a cellulose paper base and developed silver halide imaging provide an image with an opalescence appearance. The nacreous appearance is created in U.S. Pat. No. 5,888,681 by providing multiple internal reflections in the voided layer of the polymer sheet. While the opalescence appearance is present in the image, the image suffers from a loss of image sharpness or acutance, a higher density minimum position, and a decrease in printing speed compared to a typical photographic image formed on a white, reflecting base. It would be desirable if the opalescent look of the image could be maintained while improving printing speed, increasing sharpness, and decreasing density minimum. Also, while the voided polymer does provide an excellent nacreous image, the voided layer, because it is pre-fractured, is subjected to permanent deformation, thus reducing the quality of the image.

In addition to the use of white pigments in reflective consumer photographs, white pigments are also utilized in photographic display materials for diffusion of illumination light source. While the use of white pigments in display materials does provide the desired diffusion and reflection properties, the white pigments tend to change the hue angle of the color dyes in a developed photographic display image. Dye hue angle is a measure in CIElab color space of that aspect of color vision that can be related to regions of the color spectrum. For color photographic systems there is a perceptual preferred dye hue angle for the yellow, magenta, and cyan dyes. It has been found that when photographic dyes are coated on support containing white pigments, the hue angle of the developed image changes compared to the hue angle of the dyes coated onto a transparent support. The hue angle change of photographic dyes caused by the presence of white pigments often reduces the perceived quality of the dyes compared to the dye set coated on a transparent base that is substantially free of white pigments. It would be desirable if a developed photographic dye set coated on a reflective support material had a dye hue angle that was not significantly different than the same dye set coated on a transparent support.

Nacreous pigments added to a matrix, such as paint or plastic, have been known to exhibit a nacreous appearance. The prior art use of the nacreous pigments have been for pigmenting paints, printing inks, plastics, cosmetics, and glazes for ceramics and glass. Nacreous pigments are dispersed in a matrix and then painted or printed onto a substrate. Pearl luster pigments containing titanium dioxide have been successfully employed for many years. They are constructed in accordance with the layer substrate principle, with mica being employed virtually without exception as substrate.

A disadvantage of mica is that in the course of formation of titanium dioxide it induces the anatase modification, although what is frequently desired is the rutile modification, which possesses a higher refractive index and further advantageous properties. It is, therefore, necessary to bring about the rutile modification by adding foreign ions, especially tin (IV) ions. Mica pigments are used widely in the printing and coating industries, in cosmetology, and in polymer processing. They are distinguished by interference colors and a high luster. For the formation of extremely thin layers, however, mica pigments are not suitable, since the mica itself, as a substrate for the metal-oxide layers of the pigment, has a thickness of from 200 to 1200 nanometer. A further disadvantage is that the thickness of the mica platelets within a certain fraction defined by the platelet size in some cases varies markedly about a mean value. Moreover, mica is a naturally occurring mineral which is contaminated by foreign ions. Furthermore, technically highly complex and time-consuming processing steps are required including, in particular, grinding and classifying.

Pearl luster pigments based on thick mica platelets and coated with metal oxides have, owing to the thickness of the edge, a marked scatter fraction, especially in the case of relatively fine particle-size distributions below 20 micrometers. As a substitute for mica, it has been proposed to use thin glass flakes which are obtained by rolling a glass melt with subsequent grinding. Indeed, interference pigments based on such materials exhibit color effects superior to those of conventional, mica-based pigments. Disadvantages, however, are that the glass flakes have a very large mean thickness of about 10–15 micrometers and a very broad thickness distribution (typically between 4 and 20 micrometers), whereas the thickness of interference pigments is typically not more than 3 micrometers.

In U.S. Pat. No. 5,340,692 (Vermeulen et al) an imaging receiving material with nacreous pigment for producing contone images according to the silver salt diffusion process is disclosed. According to the process disclosed in U.S. Pat. No. 5,340,692, contone images with an antique look can be obtained utilizing the silver salt diffusion transfer process without the need of special processing liquids using a nacreous pigment in the imaging receiving layer or located between the support and the image receiving layer. The silver halide imaging layers used are created with retained silver and, therefore, are not semitransparent. Because the nacreous pigments used are contained in the imaging receiving layer and not silver halide imaging layer, the image form will not have a uniform nacreous appearance, as the density of the transferred silver halide image block the multiple reflections from the nacreous pigments. Further, the nacreous pigments utilized are too large and in too great a concentration to be included in the silver halide imaging layer as a rough surface would result, reducing the desired nacreous appearance of the image. The gold flakes used in the example in U.S. Pat. No. 5,340,692 are an attempt to simulate prior art black-and-white photographic "Sepatone" appearance produced during a post process treatment of the imaging layers. While the image in the example does have an antique appearance, the image does not have a nacreous appearance.

In U.S. Pat. No. 4,269,916 (Bilofsky et al) and related patents U.S. Pat. No. 4,288,524 and U.S. Pat. No. 4,216,018, instant photographic products having reflective layers which comprise lemellar interference pigments are disclosed. The intended use of the lemellar pigments is to create a pleasing white reflective appearance for the base material without the need for blue tints. It has been proposed that flat particles of metal oxides created by coating salts with metal oxides and later dissolving the salts leaving a thin flake of metal oxide as a substitute for spherical $TiO_2$ particles. Titanium dioxide particles typically are utilized in photographic art to create a white reflective surface for the viewing of print materials. The intent of U.S. Pat. No. 4,269,916 is to provide a white reflecting surface that does not have an angular viewing appearance and a consistent $L^*$, thus the invention materials do not exhibit a nacreous appearance. Examples in U.S. Pat. No. 4,269,916 show high reflectivity at a variety of collection angles which is opposite of a nacreous appearance where reflectivity changes as a function of collection angle. Further, the lemellar pigments are not present in the silver halide imaging layers or in the base materials used in the invention.

In U.S. Pat. No. 5,858,078 (Andes et al), a process for the production platelet like, substrate free $TiO_2$ pigment is disclosed for use in printing inks, plastics, cosmetics and foodstuffs is.

In U.S. Pat. No. 5,733,658 (Schmid et al) luster pigments obtainable by treating titania coated silicate based platelets from 400° C. to 900° C. with a gas mixture comprising a vaporized organic compound and ammonia are described as useful for coloring paints, inks, plastics, glasses, ceramic products, and decorative cosmetic preparations.

When imaging supports are subject to variations in ambient conditions over long periods of time, the image-containing layers and resin layers tend to deteriorate into a mass of cracks which are aesthetically undesirable and which, in extreme cases, extend over the entire print completely destroying the image. All polymers are inherently prone to chemical degradation that leads to loss of mechanical properties. They undergo thermal degradation during processing such as extrusion of thin films, and photooxidative degradation with long-term exposure to light. The $TiO_2$ utilized in U.S. Pat. No. 5,858,078 and U.S. Pat. No. 5,733,658 catalyzes and accelerates both thermal and photooxidative degradation. In the art of resin coating imaging papers, the melt polymers are extruded at high temperatures and are also subjected to high shear forces. These conditions may degrade the polymer, resulting in discoloration and charring, formation of polymer slugs or "gels", and formation of lines and streaks in the extruded film from degraded material deposits on die surfaces. Also, thermally degraded polymer is less robust than non-degraded polymer for long-term stability, and may thereby shorten the life of the print.

It has been shown that when imaging layers (silver halide, ink jet, flexography, laser toner, and the like) are applied to nacreous base materials, the nacreous appearance of the image is optimized when the image forming layers contain semitransparent dyes. The use of pigmented inks and dyes in the imaging layers tend to reduce the nacreous appearance of the image. In U.S. Pat. No. 6,071,654 (Camp et al) silver halide imaging layers that are semitransparent are coated on a nacreous support containing a voided polymer layer. The voided polymer layers create flat platelets oriented parallel to each other. The reflection which reaches the eye is primarily specular. It arises in depth, since each transparent polymer platelet reflects some of the incident light and reflects the remainder. The images in U.S. Pat. No. 6,071,654 exhibit a nacreous appearance.

PROBLEM TO BE SOLVED BY THE INVENTION

There is a need for a reflective imaging material that provides a nacreous or pearlescent appearance that provides a excellent imaging quality.

SUMMARY OF THE INVENTION

It is an object of the invention to provide improved imaging materials.

It is another object to improved image appearance compared to prior art voided base imaging materials.

It is a further object to provide imaging materials that have a nacreous appearance.

These and other objects of the invention are accomplished by an imaging element comprising an imaging layer, a nacreous pigment, and at least one layer comprising voids.

ADVANTAGEOUS EFFECT OF THE INVENTION

The invention provides nacreous images that provide a rich iridescence with exceptional image sharpness.

DETAILED DESCRIPTION OF THE INVENTION

The invention has numerous advantages over prior art imaging reflective materials. The reflective materials of the invention provide an image with a nacreous appearance while maintaining efficient reflection of light and providing excellent sharpness. Maintaining image sharpness and whiteness is important, as consumers expect images to be high in quality. Additional it provides a means to deliver nacreous appearance with the use of nacreous pigments. These pigments may be used with voids that also provide a degree of nacreous appearance. In addition the nacreous pigment may be used as a voiding aid within a polymer layer.

The nacreous imaging materials of the invention provide an eye-catching appearance that makes them particularly desirable in imaging applications that require obtaining the attention of the consumer. One example includes display materials that are intended to communicate an advertising message to people in a public setting such as a bus stop, train station, or airport. The nacreous images are differentiated in look from prior art materials and, thus, provide the pop and sizzle that can catch the consumer's attention. By providing the nacreous image with a pressure sensitive adhesive, the tough, durable nacreous image can be applied to various surfaces, which is particularly desirable for the youth market.

Photographic nacreous labels of the invention utilized in packaging markets enable a differentiated look and consumer appeal on store shelf. The utilization of the thin, flexible, and tough silver halide materials results in a packaging material having many superior properties. The packaging materials of the invention have a depth of image unsurpassed by existing packaging materials. The packaging materials of the invention may be utilized with a variety of packaging materials that are suitable pressure sensitive labeling, such as shampoo bottles, perfume bottles, and film boxes. The packaging materials of the invention, while having the advantage of superior image, are available on thin base materials which are low in cost while providing superior opacity and strength. The packaging materials of the invention, as they may be imaged by flash optical exposure or digital printing, have the ability to be formed in short runs and to be rapidly switched from one image to the next without delay.

The term "nacreous" refers to a pearly, luster, and nacreous appearance. This may include a metallic, lustrous, and somewhat iridescent effect. The nacreous effect is the result of interference pigments that are platelet-like in their structure. Typically these are elongated platelet-like structures of silicate-based materials such as mica, feldspar, and quartz. These pigments tend to cause specular and diffuse reflection, and they also transmit some light. The use of nacreous pigments in the paint and printing industry are typically designed to create a variety of eye-popping colors. These materials are typically coated over dark black backgrounds to help accentuate the eye-popping optical effects. Special metal oxide coatings are applied to mica particles in very thin layers. This allows for some light to be refracted, while other light will transmit through to the near transparent layers of the mica particle to be refracted at a slightly different angle. Since these pigments are suspended in a binder polymer of yet another refractive index, there are multiple light refractions that create a lustrous appearance. In addition, the chemistry of the coating that is applied to the mica particles may be varied to create various colors. Metal oxide coatings that may be used in an embodiment of this invention include titanium, iron, chromium, barium, aluminum, zinc, zirconium, bismuth vanadate, nickel titanate, chromium titanate, lead, and others. While these produce some exciting colors in the field of photography and imaging, traditional print materials have a white background. Additionally, it should be noted that the thickness of the metal oxide coating on the mica may also impact the color. In a preferred embodiment of this invention the metal oxide coating on the mica particles may comprise titanium, aluminum, and/or barium. These materials are preferred because it is desirable to have a more traditional white background that can be achieved with these materials. The most preferred metal oxide is titanium because of its superior whiteness. Typically it is important to control the thickness of the metal oxide coating to less than 120 nanometers to achieve a blue white appearance.

With nacreous pigments used in imaging application, it may be desirable to have non-uniform platelet thickness and small particles to create a white nacreous appearance. In imaging application where a different look is desirable, the use of thicker particles and more uniform spacing of platelets to each other creates a color interference that is more characteristic of mother-of-pearl. In general, the lustrous pigments referred to in this invention are pigments that consist of flat mica platelets coated with titanium dioxide or other metal oxides. They are irregular in shape and may vary in thickness from 0.1 to 0.5 micrometers, although some individual particles may be thicker. The particles may have a length of up to 500 micrometers. The coating applied to the mica particles should be controlled in thickness, but the overall thickness is one parameter that controls the overall color appearance. Each transparent coating helps to create the lustrous or pearlescent effect. The coating of these pigments influences the perceived texture of the pearl luster effect and adds a new dimension of beauty and quality to the image. The coating may be colored with other compatible transparent pigments and dyestuffs. Metallic effects can be simulated by adding small amounts of carbon black with some silvery white pigments. The color seen is different than color pigments and dyes in that the color and lustrous iridescence is produced by light interference and not absorption or reflection of light. This is a surprisingly unique attribute to the field of silver halide photography and imaging. With the use of nacreous pigments there are many refractive interface that can produce a unique appearance to an imaging element. A light ray striking a layer containing nacreous platelets must pass through a substantially transparent layer of relatively lower refractive index binder polymer surrounding the platelet, and then the ray is then partially reflected by the metal oxide coating on the surface. The remaining part passes into the metal oxide coating layer and is again reflected as it exits the layer at the interface with the mica particle. Since the coating is very thin and the mica platelets are substantially transparent, the remaining light has many opportunities to be reflected at different angles. This helps to provide the luster and nacreous appearance, as well as to add a three-dimensional quality to the image. The resulting color effect that is produced depends on the light reflection from the interfaces, as well as the type of coating on the mica particles. The multiple interfaces cause the reflected light to be slightly out of phase. It should also be noted that the color varies based on the angle of illumination and that an iridescence effect can be seen. Control of this effect is desirable depending on the effect that needs to be conveyed by the image. As noted above the thickness and type of the coating on the mica particles are factors that need to be considered. In addition the particle size can also be used to control the effect. For use in a photographic element it is desirable to have a smooth surface. To achieve this, a small particle is best but the layer thickness of the binder polymer in which the pigments are suspended may also be increased as well as applying clear overcoats. Larger particles are desirable when a bold effect with visual impact is desired. The nacreous effect can be changed by adjusting the particle size, metal oxide coating thickness and type, as well as the concentration of the pigment. In general, low pigmentation levels are better at producing a three-dimensional effect. This effect may be enhanced by applying a thick clear layer over the top of the nacreous pigments. When a more metallic sheen is desired, higher pigmentation levels are best. It should also be noted that different effects may be achieved by adding other transparent pigments and dyes in the layers. Since light sensitive photographic layers produce dye couplers that are semitransparent and typically do not contain pigment particles; they are uniquely positioned to be able to create synergistic effects with the nacreous pigments.

The nacreous pigments are relatively stable and generally resistant to alkali and acids, as well as high temperature. They can be dispersed in most carrying (binder polymer) media. Since the particles are substantially transparent, the use of a carrying media that is also transparent provides the maximum effect. If a more translucent carrying media is used, more nacreous pigment may be needed to achieve the same level of nacreous appearance.

In some applications it may be desirable to also have a nacreous pigment that is also conductive. This has some unique advantages in the area of photography that uses light sensitive layers. Static accumulation and discharge can result in a fogged layer. Being able to provide a conductive path that helps to prevent the charge from building up is an important element for imaging media. This not only helps prevent light fogging of light sensitive layer, but also allows sheets to slide over each other and various equipment parts without static buildup or cling of one sheet to another. This type of pigment is also a means of adding conductivity to the emulsion side of a photographic element. Conductive nacreous pigments consist of an inter core of platelet mica that is coated with materials such as $TiO_2$, $SiO_2$ and further coated with an outer dense layer of conductive, inorganic mixed metal oxide. A typical material is antimony-doped tin dioxide. The elongated particles of mica are useful in providing a conductive pathway when particles are touching.

The origin of the beauty of a genuine pearl has been well documented. It is known that its luster and color come from the multiple smooth concentric layers of nacre, i.e., calcium carbonate layer, organic constituent (conchiolin) layer. Each of these layers partially reflects and transmits light. Hence, a sense of depth and luster is observed in the reflection. Pigments that try to simulate the visual effect of a pearl are called as pearlescent or nacreous pigments. The first nacreous pigment was the natural pearl. The commercial grades of nacreous pigments are made of thin transparent platelets of high refractive index. These pigments are so designed that multiple reflections and transmissions occur and, as a result, a sense of depth is obtained in the overall reflected image. The characteristics of the pigment determine whether color is produced by light interference (specifically called as interference pigments) or no color is produced (called as white nacreous pigments).

Some of the earliest pearlescent pigments were the plate-like bismuth oxychloride crystals, and basic lead carbonate. These pigments reflect light similar to a pearl essence crystal. Due to toxicity of lead, bismuth oxychloride (BiOCl) crystals have seen an increased use in the marketplace. BiOCl is generally crystallized from solution into smooth, thin platelets which has a particle size ranging from 5 $\mu$m and 15 $\mu$m.

The other commonly used pearlescent pigments are those made from mica coated with either titanium dioxide (U.S. Pat. No. 4,040,859), iron oxide (U.S. Pat. No. 3,087,829), zirconium dioxide (U.S. Pat. No. 3,087,828), or other high refractive index materials. Mica is used because it is transparent to light and can be cleaved into extremely thin flakes. Examples of mica suitable for pearlescent pigments are muscovite, paragonite, phlogopite, biotite, and lepidolite. The mica platelets are then coated with a thin single layer or multiple layers of high refractive index inorganic oxide. The reflection efficiency depends to a large extent on the refractive index difference between the mica platelet and the inorganic oxide coating. This layered structure enables it to function like a pearlescent pigment. The oxide coating provides the optical effects like luster, interference reflection color (if oxide coating is sufficiently thick) and absorption color (if the oxide contains color material). The size of the mica particle also plays an important role in determining the final reflected image. The weight of the mica in the pigment usually lies between 40% and 90% and most usually in the range of 60% and 80%. If titanium dioxide is used as the coating and its coating thickness is increased, then an iridescence effect (color) is observed. The dimensions of pearlescent pigments used in this invention may be between 5 micrometer and 400 micrometer and preferably between 5 micrometer and 100 micrometer because particles less than 5 micrometer are not very efficient in creating the nacreous appearance, while particles greater than 100 micrometer progressively get rougher. Excessive roughness on the surface tends to shut down the nacreous appearance. The thickness of the pigment is preferably between 0.1 micrometer and 0.6 micrometer and more preferably between 0.2 micrometer and 0.4 micrometer. Particles less than 5 micrometer or less than 0.2 micrometer typically do not have sufficiently higher nacreous appearance, while particles greater than 400 micrometer in length or 0.6 micrometer in width typically are very large and tend to create roughness which starts to shut down the nacreous effect.

Other optically variable pigments that are suitably used are silicon oxide coated with thin layers of aluminum (5 nanometer and 10 nanometer) or titanium dioxide, and magnesium fluoride crystals coated with chromium have also been used. These pigment structures have been highlighted in U.S. Pat. No. 3,438,796. New optically variable pigment structures based on coated platelet like metallic substrates have been disclosed in U.S. Pat. No. 5,364,467 and U.S. Pat. No. 5,662,738. U.S. Pat. No. 5,976,511 discloses pigments composed of barium sulfate particles and coated with zinc oxide, cerium oxide, or titanium dioxide which have a pearly luster.

The photographic elements of this invention may utilize an integral emulsion bonding layer that allows the emulsion to adhere to the support materials during manufacturing and wet processing of images without the need for expensive subbing coatings. Polyethylene is preferred because it provides excellent adhesion to gelatin based binders which are typically used in silver halide emulsions.

The terms as used herein, "top", "tupper", "emulsion side", and "face" mean the side or toward the side of a photographic member or imaging element bearing the imaging layers. The terms "bottom", "lower side", and "back" mean the side or toward the side of the photographic member or imaging element opposite from the side bearing the image photosensitive imaging layers or developed image. Nacreous appearance is a pearly, luster, iridescent, metallic sheen. A characteristic property of a nacreous appearance is an angular dependence of viewing angle.

For the imaging element of this invention, imaging layers are generally applied to a white reflective base, and the image layers comprise nacreous materials. In the invention a photographic element comprises nacreous pigments. This embodiment is preferred because a photographic element that comprises nacreous pigment has a unique pearly luster appearance. Such a photographic element has a unique capability to preserve images with special luster and sheen that is not available in traditional photographs or commercial displays. A preferred embodiment of this invention comprises nacreous material in a photographic layer which is on a white reflective base. The white reflective base provides an excellent surface and background while viewing prints. In particular, it is desirable to have a white reflective base that has an L* of greater than 92. L* greater than 92 are desirable because they provide good contrast to the image and are pleasing to the viewer. Highly reflective whites are highly desirable from a final consumer standpoint. L* or lightness and opacity were measured for using a Spectrogard spectrophotometer, CIE system, using illuminant D6500.

Nacreous or pearlescence appearing media has been shown to be highly desirous from a commercial standpoint. Incorporation of nacreous pigments in a substantially transparent substrate or construction of composite materials containing localized voiding of a specific geometry, orientation, and formulation can produce both "colored" nacreous and "white" nacreous media. For both types, this nacrescence results in perceived depth, luster, and a metallic appearance. Correct measurement of these materials is required for robust design.

For both pigment and voiding methods, "white" nacreous luster is a function of the orientation, as well as the spacing and composition of the materials. The luster and depth appearance of the media are mainly due to the reflected light that reaches the eye. Both pigments and voids that provide a nacreous appearance function as substantially transparent platelets oriented parallel to each other. This results in depth as each platelet reflects some of the incident light while transmitting the rest. Any imperfections due to surface defects or platelet or void orientation misalignments will cause the light to be scattered in a non-specular direction, and will degrade the nacreous appearance of the material.

In addition, the natural tendency for randomness in regards to platelet or void alignment and spacing will render the media incapable of producing color by light interference. Any color produced by one alignment and spacing will have a tendency to be counteracted by other encountered alignments and spacing. However, gross geometric misalignments of the platelets or voids will also result in less than desirable functionality, and a method of measuring this defect is required as well.

FLOP is a test method used to measure the nacreous quality of materials of interest. 45-degree incident light is collected at 10, 45, and 110 degrees from the specular reflection angle. The spectrophotometric output, e.g., CIE L* (L1*, L2*, L3* respectively) is used as follows:

$$\text{FLOP}=15(L1^*-L3^*)^{1.11}/L2^{*0.86}$$

whereby FLOP values between less than 10 have no nacreous appearance and FLOP values greater than 10 are indicative of a nacrescent appearance.

Furthermore, quality monitoring of these nacreous materials, when combined with one or more semitransparent color forming dye layers, places limitations on the usefulness of measurements taken with typically found reflection densitometers having 0/45 geometry. This is due to the angular dependency of these media. This angular viewing dependency of the media and the inherent randomness of the structure will result in errors "reading out " the dye formed due to the variability of the media at any one collection angle. These highly specular and translucent materials will reflect some light in angular dependent non-specular directions as well. It has been found that although incident light and collection at 0/45 will allow for a prediction of density minimum versus FLOP, these values are no longer predictive, as density increases from density minimum to density maximum as color dye forming layers are added to the media.

This can be explained as a function of the dye density. As density increases, the ability for multiple reflections through the media decreases. As the reflection passes approach one, the nacreous look will no longer be apparent.

Spectrogoniometric measurements can be employed to measure the media at various angles, but spectrogoniometric readings are tedious and the apparatus is expensive. An alternative for quality monitoring purposes to assess the amount of color forming layers coated and subsequently processed would be useful. During a color photographic coating operation, the need to reduce inherent manufacturing variability of color forming coupler levels is required and this data collection by conventional reflection 0/45 densitometry is impeded by the natural variability found in the nacreous media. Slight changes in the reflective properties of the base media will result in more or less light reaching the densitometer which, in turn, can result in an erroneous readout of the formed dye.

One such method to provide correct assessment during a coating operation would be to remove the nacreous properties of the media. This can be accomplished by collecting light from the prepared sample at a grazing angle that would minimize the nacreous layer contributions. Diffuse 8 degree sphere optical geometry handheld spectrophotometers have been shown to meet this need.

In a preferred embodiment of this invention, said photographic element comprises nacreous pigments wherein said element has a flop measurement of between 2 and 65. Flop measurements below 2 have little or no nacreous appearance, while flop measurements above 65 are difficult to achieve with nacreous pigments.

Any suitable biaxially oriented polyolefin sheet may be utilized for the sheet on the top side of the laminated base of the invention. Microvoided composite biaxially oriented sheets are preferred because the voids provide opacity without the use of $TiO_2$. The use of $TiO_2$ in the same layer or in a layer above the voids and or nacroeus pigment will reduce the nacreous appearance. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869. Additionally it is reported in U.S. Pat. No. 5,888,681 that voided polyolefin without $TiO_2$ above the voided layer provides an opalescent appearance.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 150 micrometers, preferably from 20 to 100 micrometers. Below 20 micrometers, the microvoided sheets may not be thick enough to minimize any inherent nonplanarity in the support and would be more difficult to manufacture. At thickness higher than 100 micrometers, little improvement in either surface smoothness or mechanical properties is seen, and so there is little justification for the further increase in cost for extra materials.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape but may be flat platelet-like in which the length to width ratio dimension is a ratio of at least 2/1, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials and may contain inorganic nacreous platelet-like particles as well as polymeric materials, and should be present in an amount of about 5–50% by weight based on the weight of the core matrix polymer. The void-initiating material may partially comprises a polymeric material or a combination of organic polymer and inorganic material.

When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred, and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_n OH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield nonuniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres or flat needle shaped nacreous particles, including solid or hollow glass spheres, metal or ceramic beads or inorganic particles such as clay, talc, metal oxide modified mica, barium sulfate, and calcium carbonate or metal oxide coated pigment such as mica, fledspar and quartz. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. While prior art has taught voiding with some organic or inorganic materials, the use of nacreous pigment has not been included. The use of nacreous pigments either by themselves or in combination with other known voiding agents provide a surprisingly unique means to obtain voiding and to provide a nacreous appearance to an imaging element.

For the biaxially oriented sheets on the top side, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the topmost skin layer or top layer of the biaxially oriented polymer sheet should be between 0.20 micrometers and 1.5 micrometers, preferably between 0.5 and 1.0 micrometers. Below 0.5 micrometers any inherent nonplanarity in the coextruded skin layer may result in unacceptable color variation. At skin thickness greater than 1.0 micrometers, there is a reduction in the image optical properties such as image resolution. At thickness greater that 1.0 micrometers there is also a greater material volume to filter for contamination such as clumps, poor color pigment dispersion, or contamination. Low density polyethylene with a density of 0.88 to 0.94 g/cc is a preferred material for the top skin because gelatin based image receiving layers adhere well to low density polyethylene compared to other materials such as polypropylene and high density polyethylene.

Addenda may be added to the topmost skin layer to change the color of the imaging element. For imaging use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

It has been found that a very thin coating (0.2 to 1.5 micrometers) on the surface immediately below the imaging layer can be made by coextrusion and subsequent stretching in the width and length direction. It has been found that this layer is, by nature, extremely accurate in thickness and can be used to provide all the color corrections which are usually distributed throughout the thickness of the sheet between the image receiving layer and the base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used, and high quality filtration to clean up the colored layer is much more feasible since the total volume of polymer with colorant is only typically 2 to 10 percent of the total polymer between the transparent base and the image receiving layers.

The addition of $TiO_2$ in the thin skin layer above the nacreous pigment of this invention has a significantly negative impact on the optical performance of the sheet and cause numerous manufacturing problems such as extrusion die lines and spots. It is preferred that the skin layers above the voids and or nacreous pigment should be substantially free of $TiO_2$ because the $TiO_2$ competes with the nacreous pigment and reduces its effectiveness. $TiO_2$ added to a layer below the nacreous pigment and or voids has a surprisingly positive impact on the overall whiteness of the imaging element and also improves the imaging sharpness and print seed when the imaging element is photographic.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside, as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white defined as a b* within one b* unit of zero. b* is the measure of yellow/blue in CIE space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add that amount of optical brightener to the biaxially oriented sheet. An emission greater that 5 b* units would interfere with the color balance of the prints making the whites appear too blue for most consumers.

The preferred addenda of this invention is an optical brightener. An optical brightener is colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylatninocoumarin, 1-4-Bis (O-Cyanostyryl) Benzol, and 2-Amino-4-Methyl Phenol.

The optical brightener may be added to any layer in the multilayer coextruded biaxially oriented polyolefin sheet. The preferred location is adjacent to or in the top surface layer of said sheet. This allows for the efficient concentration of optical brightener which results in less optical brightener being used when compared to traditional imaging supports. When the desired weight % loading of the optical brightener begins to approach the concentration at which the optical brightener migrates to the surface of the support forming crystals in the imaging layer, the addition of optical brightener into the layer adjacent to the top layer is preferred. When optical brightener migration is a concern as with imaging systems, the preferred exposed layer comprises polyethylene. In this case, the migration from the layer adjacent to the exposed layer is significantly reduced allowing for much higher optical brightener levels to be used to optimize image quality. Locating the optical brightener in the layer adjacent to the exposed layer allows for a less expensive optical brightener to be used as the exposed layer, which is substantially free of optical brightener, and prevents significant migration of the optical brightener. Another preferred method to reduce unwanted optical brightener migration is to use polypropylene for the layer adjacent to the exposed surface. Since optical brightener is more soluble in polypropylene than polyethylene, the optical brightener is less likely to migrate from polypropylene.

A biaxially oriented sheet of this invention which has a microvoided core is preferred. The microvoided core adds opacity, whiteness and nacreous appearance to the imaging support further improving imaging quality. Combining the image quality advantages of a microvoided core with a material, which absorbs ultraviolet energy and emits light in the visible spectrum, allows for the unique optimization of image quality as the image support can have a tint when exposed to ultraviolet energy, yet retain excellent whiteness when the image is viewed using lighting that does not contain significant amounts of ultraviolet energy such as indoor lighting. The preferred number of voids in the vertical direction at substantially every point is greater than six. The number of voids in the vertical direction is the number of polymer/gas interfaces present in the voided layer. The voided layer functions to add opacity because of the index of refraction changes between polymer/gas interfaces. Greater than 6 voids is preferred because at 4 voids or less, little improvement in the opacity of the film is observed and, thus, does not justify the added expense to void the biaxially oriented sheet of this invention.

The microvoided core of the biaxially oriented sheet of this invention also increase the opacity of the image element without the use of $TiO_2$ or other white pigments. During the printing process in which an image is formed in the image layers, simultaneous printing of imaging layers of the top and bottom sides is preferred to reduce printing time and increase image density. The voided layer, while providing opacity, also allows for the transmission of light.

The biaxially oriented sheet may also contain pigments which are known to improve the imaging responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for an imaging system are DuPont Chemical Co. R101 rutile $TiO_2$ and DuPont Chemical Co. R104 rutile $TiO_2$. Other pigments to improve whiteness and sharpness are barium sulfate, clay, or calcium carbonate. If $TiO_2$ is placed above the voided layer containing voids and or nacreous pigments, it will reduce or eliminate the nacreous effect.

The preferred amount of $TiO_2$ added to the biaxially oriented sheet below said voids and below said nacreous pigment of this invention is between 5 and 35% by weight. Below 4% $TiO_2$, the required reflection density of the biaxially oriented sheet is difficult to obtain. Above 36%, the desired whiteness is not significantly impacted. Further, above 36% $TiO_2$, manufacturing efficiency declines because of $TiO_2$ plate out on the screw, die manifold, and die lips.

In a preferred embodiment of this invention an imaging element comprises an imaging layer, a nacreous pigment, and at least one layer comprising voids. This material is preferred because it provides a unique combination of voids and nacreous pigment both of which can create a pearlescent look in a high strength tough film sheet.

In a further preferred embodiment said imaging element described above has a nacreous pigment in one layer comprising voids. This embodiment is preferred because it uniquely positions a nacreous pigment in a voided layer. Such a structure provides multiple reflections and refractive index changes as light travels from the polymer to air as well as the nacreous pigment that also has multiple refractive index changes in the metal oxide coating and layer structure the nacreous pigment. Such a composite provides a unique appearance to the image.

In an additional embodiment of the imaging element of this invention the element may have the nacreous pigment in a layer on top of the layer comprising voids. Such an imaging structure has a nacreous appearance from the nacreous pigment particles as well as the voided structure. Such a structure also has excellent opacity.

The imaging element of a preferred embodiment of this invention further comprising at least one coextruded top layer above the layer comprising voids. This embodiment is preferred because it provides for the addition of other materials with varying functionality above the voids. Such materials may include an integral polyethylene layer that promotes adhesion to both gelatin based photo sensitive layers as well as gelatin based inkjet receiving layers. In the most preferred embodiment the integral emulsion adhesion layer is immediately below the image layer. This provides for excellent adhesion. The use of low density polyethylene typically provides better adhesion to gelatin based materials than higher density polyethylene. Typically the surface of the polyethylene is cornea treated to improve the overall wettability and adhesion sites of the aqueous imaging layers. Coextrusion of a plurality of layers additional provides layers that may contain optical brighteners, tints, antioxidants or even white pigment.

In one embodiment of the invention when a nacreous pigment is used as a voiding agent in a polymer that is sufficiently stretched in either or both the machine and cross machine direction to form a void said nacreous pigment may be in the void. During the stretching process the polymer matrix may slip or tear away from the particle such that the particle is substantially separate from the polymer and therefore appear to be in the void space.

In an additional embodiment of this invention the imaging element may contain a nacreous pigment in the matrix polymer surrounding said voids. In this case the nacreous pigment particle is substantially surrounded by the polymer matrix.

An additional embodiments of this invention of the above described imaging elements which comprises either a nacreous pigment in a voided layer and a reflective layer below said voided layer or a nacreous pigment above a voided layer and a reflective layer below the voided layer. These embodiment are preferred because the reflective layer provides additional opacity, whiteness and sharpness to the imaged print material. In an additional embodiment the reflective layer further contain white pigment. Useful materials include $TiO_2$, $BaSO_4$, clay, talc, ZnS, $CaCO_3$. The most preferred material is $TiO_2$ because of it high refractive index and high degree of spectral reflectance.

The most preferred embodiment of this invention provides an imaging element with a nacreous pigment on top of a voided layer and a reflective layer below the voided layer. This embodiment is preferred because it provides a unique combination of nacreous pigment and voiding using both pigments and polymeric/air layers in combination with a highly reflective white layer below the nacreous layers. This provides an added degree of whiteness when viewing the image. In addition when an imaging layer is a photographic element, the highly reflective layer below the voided layer provides improved photographic print speed.

The preferred embodiment of this invention said nacreous pigment is in said at least one layer comprising voids further comprises at least one antioxidant. Useful antioxidant include hindered amine is selected from the group consisting of poly{[6-[(1,1,3,3-tetramethylbutylamino}-1,3,5-triazine-4-piperidinyl)-imino]-1,6-hexanediyl[(2,2,6,6-tetramethyl-4-piperdinyl)imino]}pentaerythrityl tetrakis[3-(3,5-di-tert-butyl-4-hydroxyphenyl)proprionate], and 2,4-bis(1,1-dimethylphenyl)phosphite (Irgafos 168).

The hindered amine light stabilizer (EALS) may come from the common group of hindered amine compounds originating from 2,2,6,6-tetramethylpiperidine, and the term hindered amine light stabilizer is accepted to be used for hindered piperidine analogues. The compounds form stable nitroxyl radicals that interfere with photo-oxidation of polypropylene in the presence of oxygen, thereby affording excellent long-term photostability of the imaging element. The hindered amine will have sufficient molar mass to minimize migration in the final product, will be miscible with polypropylene at the preferred concentrations, and will not impart color to the final product. In the preferred embodiment, examples of HALS include poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (such as Chimassorb 944 LD/FL), 1,3,5-triazine-2,4,6-triamine, N,N"-1,2-ethanediylbis[N-[3-[[4,6-bis[butyl(1,2,2,6,6-pentamethyl-4-piperidinyl)amino]-1,3,5-triazin-2-yl]methylamino]propyl]-N',N"-dibutyl-N',N"-bis(1,2,2,6,6-pentamethyl-4-piperidinyl)-(such as Chimassorb 119), and propanedioic acid,[[3,5-bis(1,1-dimethylethyl)-4-hydroxyphenyl]methyl] butyl-, bis(1,2,2,6,6-pentamethyl-4-piperidinyl) ester (such as Tinuvin 144), although they are not limited to these compounds.

In addition, the film may contain any of the hindered phenol primary antioxidants commonly used for thermal stabilization of polypropylene, alone or in combination with a secondary antioxidants Examples of hindered phenol primary antioxidants include benzenepropanoic acid, 3,5-bis(1,1-dimethylethyl)-4-hydroxy-,2,2-bis[[3-[3,5-bis(1,1-dimethylethy 1)-4-hydroxyphenyl]-1-oxopropoxy]methyl]-1,3-propanediyl ester (such as Irganox 1010), benzenepropanoic acid, 3,5-bis(1,1-dimethylethyl)-4-hydroxy-, octadecyl ester (such as Irganox 1076), (such as Irganox 1035), phenol, 4,4',4"-[(2,4,6-trimethyl-1,3,5-benzenetriyl)tris(methylene)]tris[2,6-bis(1,1-dimethylethyl)-(such as Irganox 1330), but are not limited to these examples. Secondary antioxidants include organic alkyl and aryl phosphites including examples such as Phosphorous acid, bis[2,4-bis(1,1-dimethylethyl)-6-methylphenyl]ethyl ester (such as Irgafos 38), ethanamine, 2-[[2,4,8,10-tetrakis(1,1-dimethylethyl)dibenzo[d,f][1,3,2] dioxaphosphepin-6-yl]oxy]-N,N-bis[2-[[2,4,8,10-tetrakis(1,1-dimethylethyl)dibenzo[d,f][1,3,2]dioxaphosphepin-6-yl] oxy]ethyl] (such as Irgafos 12), phenol, 2,4-bis(1,1-dimethylethyl)-, phosphite (such as Irgafos 168). A preferred embodiment uses Irgafos 168. The combination of hindered amines with other primary and secondary antioxidants have a synergistic benefit in a multilayer biaxially oriented polymer sheet by providing thermal stability to polymers such as polypropylene during melt processing and extrusion and further enhancing their light and dark keeping properties which is not evident in a mono layer system for imaging products such as photographs. Whenever oxygen bearing or producing pigment such as $TiO_2$ are used in plastic and in particular when they are used in voided plastic layers, it may be necessary to provide antioxidant protection to minimize polymer degradation. These unexpected results provide for a broader range of polymers that can be utilized in imaging product, thus enabling enhanced features to be incorporated into their design. Additional disclosure of antioxidant can be found in U.S. Pat. No. 6,171,751.

The invention may utilize sheets that have a nacreous pigment that works in conjunction the voids to provide a unique soft iridescence that is highly desirable in the field of fine art imaging as well as in commercial advertising where the artist is trying to create a mood in the viewer.

In a further embodiment of this invention the imaging element has a nacreous pigment in a layer on top of one layer comprising voids and nacreous pigment. This embodiment is preferred because it enables the use of more than one layer to produce the nacreous appearance. This allows the use of different nacreous pigment or the use of voids in combination with a nacreous pigment that provides a unique look to the imaging element.

Useful nacreous pigment that may be used in an embodiment of this invention may be selected from the group consisting of mica, modified mica, fledspar, and quartz. These materials provide a good base pigment that is flat or needle like that can be enhanced with a metal oxide coating that helps to provide the unique nacreous appearance. The metal oxide coatings that are preferred include titanium, aluminum, barium, iron, zinc, zirconium, bismuth vanadate, nickel titanate, and chromium titanate. Titanium based materials are most preferred because of there added whiteness.

In a further embodiment of this invention the imaging element with nacreous pigment and voids also light sensitive silver halide. The dye coupler used in silver halide are particularly suited for use with the nacreous appearance because the dyes in printed at a suitable density do not defeat the appearance. Useful silver halide materials for this invention are in described in *Research Disclosure,* September 1994, Item 36544, Section I, published by Kenneth Mason Publications, Ltd., Dudley Annex, 12a North Street, Emsworth, Hampshire PO10 7DQ, ENGLAND as well as *Research Disclosure,* Item 36544, September 1994, and the references listed therein, as well as *Research Disclosure,* September 2000, Item 437013, published by Kenneth Mason Publications, Ltd., Dudley Annex, 12a North Street, Emsworth, Hampshire PO10 7DQ, ENGLAND.

In a further embodiment of this invention the imaging element describe above may comprise inkjet receiving materials. Inkjet receiving materials are useful because they provide a means of delivering semi-transparent dyes to an imaging element that exhibit the nacreous appearance. Inkjet printers are readily available and are very useful in making a final imaged product with the nacreous pigment and voids. Materials useful in this invention include dye receiving layer or DRL for ink jet imaging may be applied by any known methods. Such as solvent coating, or melt extrusion coating techniques. The DRL is coated over a tie layer or TL at a thickness ranging from 0.1–10 um, preferably 0.5–5 um. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al., in U.S. Pat. Nos. 4,879,166, 5,14,730, 5,264,275, 5,104,730, 4,879,166, and Japanese patents 1,095,091, 2,276,671, 2,276,670, 4,267,180, 5,024, 335, 5,016,517, discloses aqueous based DRL formulations comprising mixtures of pseudo-bohemite and certain water soluble resins. Light, in U.S. Pat. Nos. 4,903,040, 4,930,041, 5,084,338, 5,126,194, 5,126,195, 5,139,8667, and 5,147, 717, discloses aqueous-based DRL formulations comprising mixtures of vinyl pyrrolidone polymers and certain water-dispersible and/or water-soluble polyesters, along with other polymers and addenda. Butters, et al., in U.S. Pat. Nos. 4,857,386, and 5,102,717, disclose ink-absorbent resin layers comprising mixtures of vinyl pyrrolidone polymers and acrylic or methacrylic polymers. Sato, et al., in U.S. Pat. No. 5,194,317, and Higuma, et all., in U.S. Pat. No. 5,059,983, disclose aqueous-coatable DRL formulations based on poly (vinyl alcohol). Iqbal, in U.S. Pat. No. 5,208,092, discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 um DRL which is coated as an aqueous dispersion of 5 parts alumoxane and 5 parts poly (vinyl pyrrolidone). The DRL may also contain varying levels and sizes of matting agents for the purpose of controlling gloss, friction, and/or finger print resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Other useful materials for embodiment of this invention include thermal dye image-receiving layer of the imaging elements of the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112, 4,927,803 and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper.

The following examples illustrate the practice of this invention. They are not intended to be exhaustive of all possible variations of the invention. Parts and percentages are by weight unless otherwise indicated.

EXAMPLES

Example 1

The proposed laminated photographic base would be prepared by extrusion laminating the following sheets to both sides of a photographic grade cellulose paper support:

Top Voided Polymer Sheet

A composite 5 layer biaxially oriented polyolefin sheet (55 micrometers thick) (d=0.75 g/cc) consisting of a microvoided and oriented polypropylene core, with a titanium dioxide pigmented system (including required color adjustment) non-microvoided oriented polypropylene layer on the top side with blue colorant and optical brightener and a 1.2 micrometers layer of medium density polyethylene as the top most layer and a clear non-microvoided oriented polypropylene layer on the bottom side of the voided layer; the void initiating material is titanium based metal oxide coated mica particle with a mean particle size of 5 micrometers.

Bottom Biaxially Oriented Polymer Sheet

A two-layer oriented polyester sheet consisting a core polyester layer and a skin layer of polyester that contains 5% by weight of a 5 micrometer silica addenda for photoprocessing conveyance. The two layer sheet was 25 micrometers thick (d=1.4 g/cc).

Both the above top and bottom sheets were extrusion laminated to a photographic grade cellulose paper of the example with a clear 13 melt index polyolefin (25 g/m$^2$). The structure of the nacreous support was as follows:

| | | |
|---|---|---|
| L1 | Silver Halide formed Image | |
| L2 | Medium Density clear Polyethylene + Blue tint | 1.2 Micrometers |
| L3 | Clear Polypropylene with Optical Brightener | 12 Micrometers |
| L4 | Void polypropylene with metal oxide particle and antioxidant | 29.8 Micrometers |
| L5 | Clear Polypropylene | 12 Micrometers |
| L6 | Clear polypropylene | 1.2 Micrometers |
| L7 | 13 MI Medium density clear polyethylene | 10 Micrometers |
| L8 | 110 g/m2 photo grade paper Cornea treated each side | 170 Micrometers |
| L9 | 13 MI Medium density clear polyethylene | 10 Micrometers |
| L10 | Biaxially oriented PET matte film (3layers) Side next to L9 was reverse printed w Logo | 25 Micrometers |
| L11 | Conductive/Writable antistat | |

L1 is the image layer.
L2–L6 is an integral biaxially polymer sheet. The L4 layer contains a metal oxide coated pigment (Afflair 110 from EM Industries, Inc.). The antioxidant used was a combinations of phenolic (Irganox 1010), aryl phosphite (Irgafos 168) and HALS (Chimassorb 944 LD/FL).
L7 is a tie layer to adhere the integral sheet and image to the base substrate.
L8 is the base substrate.
L9 is a tie layer to adhere the matte film to the back side of the substrate.
L10 is a a writable/conductive layer and may further provide frictional properties.

Example 2

The second proposed sample is a laminated photographic base prepared by extrusion laminating the following sheets to both sides of a photographic grade cellulose paper support:

Top Voided Polymer Sheet

A composite 6 layer biaxially oriented polyolefin sheet (58 micrometers thick) (d=0.75 g/cc) consisting of a microvoided and oriented polypropylene core, with a titanium dioxide pigmented system (including required color adjustment) non-microvoided oriented polypropylene layer on the top side with blue colorant and optical brightener and a 0.8 micrometers layer of medium density polyethylene as the top most layer and a clear non-microvoided oriented polypropylene layer on the bottom side of the voided layer, the void initiating material is poly(butylene terephthalate).

Bottom Biaxially Oriented Polymer Sheet

A two-layer oriented polyester sheet consisting a core polyester layer and a skin layer of polyester that contains 5% by weight of a 5 micrometer silica addenda for photoprocessing conveyance. The two layer sheet was 25 micrometers thick (d=1.4 g/cc).

Both the above top and bottom sheets were extrusion laminated to a photographic grade cellulose paper of the example with a clear 13 melt index polyolefin (25 g/m$^2$). The structure of the nacreous support was as follows:

| | | |
|---|---|---|
| L1 | Silver Halide formed Image | |
| L2 | Medium Density Polyethylene + Blue tint | 0.8 Micrometers |
| L3 | Clear Polypropylene with Optical Brightener | 0.8 Micrometers |
| L4 | Clear polypropylene with nacreous pigment and antioxidant | 27 Micrometers |
| L5 | Void polypropylene with PBT | 16.9 Micrometers |
| L6 | 31% Anatase TiO$_2$ in Polypropylene | 12 Micrometers |
| L7 | Clear polypropylene | 0.8 Micrometers |
| L8 | 13 MI Medium density clear polyethylene | 10 Micrometers |
| L9 | 110 g/m2 photo grade paper Cornea treated each side | 170 Micrometers |
| L10 | 13 MI Medium density clear polyethylene | 10 Micrometers |
| L11 | Biaxially oriented PET matte film (3layers) Side next to L9 was reverse printed w Logo | 25 Micrometers |
| L12 | Conductive/Writable antistat | |

L1 is the image layer.
L2–L7 is an integral biaxially polymer sheet. The L4 layer has 10% by weight of a nacreous pigment (Afflair 110 from EM Industries, Inc.).
L8 is a tie layer to adhere the integral sheet and image to the base substrate.
L9 is the base substrate.
L10 is a tie layer to adhere the matte film to the back side of the substrate.
L11 is a a writable/conductive layer and may further provide frictional properties.

The invention has been described in detail with particular reference to certain preferred embodiments thereof, but it will be understood that variations and modifications can be effected within the spirit and scope of the invention.

What is claimed is:

1. An imaging element comprising an imaging layer, a nacreous pigment, and at least one layer comprising voids, wherein said nacreous pigment is present in a layer on top of said at least one layer comprising voids.

2. The imaging element of claim 1 further comprising at least one coextruded top layer above said at least one layer comprising voids.

3. The imaging element of claim 1 and further comprising a reflective layer below said voided layer.

4. The imaging element of claim 3 wherein said reflective layer below said voided layer comprises white pigment.

5. The imaging element of claim 3 wherein said reflective layer below said voided layer comprise TiO$_2$.

6. The imaging element of claim 1 wherein said nacreous pigment is in said at least one layer comprising voids further comprises at least one antioxidant.

7. The imaging element of claim 1 wherein said nacreous pigment further comprises a metal oxide.

8. The imaging element of claim 7 wherein said nacreous metal oxide is selected from the group consisting of titanium, aluminum, or barium.

9. The imaging element of claim 8 wherein said metal oxide is titanium.

10. The imaging element of claim 1 wherein said imaging layer comprises light sensitive silver halide.

11. The imaging element of claim 1 wherein said imaging layer comprises inkjet receiving materials.

12. The imaging element of claim 1 wherein said imaging layer comprises thermal dye receiving materials.

13. The imaging element of claim 1 wherein said imaging layer comprises electrophotographic receiving material.

14. The imaging element of claim 1 wherein said nacreous pigment is selected from the group consisting of mica, modified mica, fledspar, and quartz.

15. An imaging element comprising an imaging layer, a nacreous pigment, at least one layer comprising voids and at least one coextruded top layer above said at least one layer comprising voids.

16. The imaging element of claim 15 wherein said nacreous pigment is in said at least one layer comprising voids.

17. The imaging element of claim 16 wherein the nacreous pigment is in said voids.

18. The imaging element of claim 16 wherein said nacreous pigment is in the matrix polymer surrounding said voids.

19. The imaging element of claim 16 and further comprising a reflective layer below said voided layer.

20. The imaging element of claim 15 and further comprising a reflective layer below said voided layer.

21. The imaging element of claim 20 wherein said nacreous pigment is present in a layer on top of said at least one layer comprising voids.

22. The imaging element of claim 15 wherein said nacreous pigment further comprises a metal oxide.

23. The imaging element of claim 22 wherein said nacreous metal oxide is selected from the group consisting of titanium, aluminum, or barium.

24. The imaging element of claim 23 wherein said metal oxide is titanium.

25. The imaging element of claim 15 wherein said imaging layer comprises light sensitive silver halide.

26. The imaging element of claim 15 wherein said imaging layer comprises inkjet receiving materials.

27. The imaging element of claim 15 wherein said imaging layer comprises thermal dye receiving materials.

28. The imaging element of claim 15 wherein said imaging layer comprises electrophotographic receiving material.

29. An imaging element comprising an image layer, a nacreous pigment, at least one layer comprising voids, and a reflective layer below said voided layer, and wherein said nacreous pigment is in said at least one layer comprising voids.

30. The imaging element of claim 29 wherein said nacreous pigment is in said voids.

31. The imaging element of claim 29 wherein said nacreous pigment is in the matrix polymer surrounding said voids.

32. The imaging element of claim 29 wherein said nacreous pigment is titanium.

33. The imaging element of claim 29 wherein said imaging layer comprises light sensitive silver halide.

34. The imaging element of claim 29 wherein said imaging layer comprises inkjet receiving materials.

35. The imaging element of claim 29 wherein said imaging layer comprises thermal dye receiving materials.

36. An imaging element comprising an imaging layer, a nacreous pigment, and at least one layer comprising voids wherein said nacreous pigment is present in a layer on top of one layer comprising voids and nacreous pigment.

37. The imaging element of claim 36 wherein the nacreous pigment is in voids.

38. The imaging element of claim 36 wherein said nacreous pigment is in the matrix polymer surrounding said voids.

39. The imaging element of claim 36 wherein said imaging layer comprises light sensitive silver halide.

40. The imaging element of claim 36 wherein said imaging layer comprises inkjet receiving materials.

41. The imaging element of claim 36 wherein said imaging layer comprises thermal dye receiving materials.

* * * * *